(12) United States Patent
Stinner et al.

(10) Patent No.: US 11,447,918 B2
(45) Date of Patent: Sep. 20, 2022

(54) INTENTIONALLY REPLACEABLE EARTH WORKING MACHINE MILLING UNIT HAVING A COOLING FAN FOR COOLING A CLOSED OPERATING-MEDIUM CIRCUIT

(71) Applicant: Wirtgen GmbH, Windhagen (DE)

(72) Inventors: Tobias Stinner, Nister (DE); Christian Berning, Züplich (DE); Sebastian Bötzius, Siegburg (DE)

(73) Assignee: Wirtgen GmbH

( * ) Notice: Subject to any disclaimer, the term of this patent is extended or adjusted under 35 U.S.C. 154(b) by 55 days.

(21) Appl. No.: 16/867,862

(22) Filed: May 6, 2020

(65) Prior Publication Data
US 2020/0378075 A1  Dec. 3, 2020

(30) Foreign Application Priority Data

May 27, 2019 (DE) ...................... 10 2019 114 184.2

(51) Int. Cl.
*E01C 23/088* (2006.01)
*E01C 23/12* (2006.01)

(52) U.S. Cl.
CPC .......... *E01C 23/088* (2013.01); *E01C 23/127* (2013.01)

(58) Field of Classification Search
CPC ........ F16N 39/04; F16N 39/02; E01C 23/088; E01C 23/127; F16H 57/04;
(Continued)

(56) References Cited

U.S. PATENT DOCUMENTS 5,219,016 A * 6/1993 Bolton ................ B60H 1/3227
165/140
7,040,837 B2  5/2006 Gaertner et al.
(Continued)

FOREIGN PATENT DOCUMENTS

CN    1605682 A    4/2005
CN    102213097 A    10/2011
(Continued)

OTHER PUBLICATIONS

English language machine translation of Burkhart, German patent publication No. DE-10202613-A, published Jul. 31, 2003 (4 pages) (Year: 2003).*
(Continued)

*Primary Examiner* — Abby J Flynn
*Assistant Examiner* — Michael A Goodwin
(74) *Attorney, Agent, or Firm* — Lucian Wayne Beavers; Patterson Intellectual Property Law, PC

(57) ABSTRACT

A milling unit for an earth working machine including a milling drum and a milling drum housing; the milling unit comprising a closed operating-medium circuit that includes an operating-medium pump that is embodied to drive the operating medium to circulate in the operating-medium circuit; the operating-medium circuit including a heat exchanger through which operating medium flows during circulating flow of the operating medium; the heat exchanger being arranged on the milling drum housing. Provision is made that the heat exchanger is configured for flow impingement by a cooling gas separate from the operating medium; and that a cooling fan, which is embodied to drive the cooling gas for flow impingement onto the heat exchanger, is arranged on the milling drum housing.

12 Claims, 4 Drawing Sheets

(58) Field of Classification Search
CPC ............ F16H 57/0412; F16H 57/0415; F16H 57/0417; F01P 2003/006; F01P 2003/182; F01P 2003/187
See application file for complete search history.

(56) References Cited

U.S. PATENT DOCUMENTS

| | | | |
|---|---|---|---|
| 8,534,092 | B2 | 9/2013 | Lee et al. |
| 9,080,293 | B2 | 7/2015 | Graner et al. |
| 10,533,705 | B2 | 1/2020 | Lubischer et al. |
| 2004/0021364 | A1 | 2/2004 | Busley et al. |
| 2005/0117970 | A1 | 6/2005 | Gaertner et al. |
| 2011/0248110 | A1 | 10/2011 | Graner et al. |
| 2011/0255919 | A1* | 10/2011 | Graner .................... F16C 19/38 404/90 |
| 2011/0277495 | A1 | 11/2011 | Lee et al. |
| 2013/0319778 | A1* | 12/2013 | MacGregor ............ B60K 11/04 180/68.1 |
| 2015/0361866 | A1* | 12/2015 | Baldus ................. E01C 23/088 417/364 |
| 2017/0292649 | A1* | 10/2017 | Lubischer ............ B60H 1/3227 165/140 |

FOREIGN PATENT DOCUMENTS

| | | |
|---|---|---|
| CN | 104233937 A | 12/2014 |
| CN | 102242953 B | 11/2015 |
| CN | 207881175 U | 9/2018 |
| DE | 10202613 A1 * | 7/2003 ......... F16H 57/0413 |
| DE | 102010023024 A1 | 10/2011 |
| DE | 102012010947 A1 | 7/2013 |
| DE | 202014100953 U1 | 7/2015 |
| DE | 102016004271 A1 | 10/2017 |
| KR | 970047395 U | 7/1997 |

OTHER PUBLICATIONS

China Office Action for corresponding patent application No. 202010434834, dated Jul. 26, 2021, 6 pages (not prior art).
China Office Action for corresponding patent application No. 2022052402799960, dated May 27, 2022, 4 pages (not prior art).

* cited by examiner

INTENTIONALLY REPLACEABLE EARTH WORKING MACHINE MILLING UNIT HAVING A COOLING FAN FOR COOLING A CLOSED OPERATING-MEDIUM CIRCUIT

BACKGROUND OF THE INVENTION

1. Field of the Invention

The present invention relates to a milling unit for an earth working machine, for example a road milling machine, a recycler, or a surface miner; the milling unit encompassing a milling drum and a milling drum housing supporting the milling drum rotatably around a milling drum axis; the milling drum housing surrounding the milling drum on several sides; the milling unit comprising a closed operating-medium circuit that encompasses an operating-medium pump that is embodied to drive the operating medium to circulate in the operating-medium circuit; the operating-medium circuit encompassing a heat exchanger through which operating medium flows during circulating flow of the operating medium; the heat exchanger being arranged on the milling drum housing.

The present invention relates in particular to a replaceable milling unit that is embodied to be connected to a machine frame of an earth working machine sufficiently fixedly but releasably for the duration of one or several intended milling operations. A "releasable" connection for purposes of the present Application is a connection that can be released nondestructively. Because the connection of the milling unit to a machine frame of an earth working machine is sufficiently fixed but nevertheless intentionally releasable, the milling unit can be removed as necessary, as a subassembly, from the machine frame of the earth working machine, for example if the earth working machine is to be refitted for a different milling task that cannot be performed with the milling unit currently connected to the machine frame, or if the milling unit must be disconnected from the machine in the context of transport in order to comply with requirements for mass and weight.

2. Description of the Prior Art

The milling unit of an earth working machine is usually supplied with operating media, for example with liquid lubricants such as lubricating oils, or with hydraulic oils or with cooling liquids. These include, in particular, the transmission oil of a milling drum transmission that converts the rotation speed of a drive shaft of a drive motor of the earth working machine into a milling drum rotation speed that is usable for milling operation. The transmission oil heats up during operation. The operational heat of the transmission oil must therefore be dissipated once a specific temperature is reached, in order to maintain the milling unit in an operationally ready state and to prevent overheating of the transmission oil.

DE 10 2016 004 271 A1 discloses a milling unit of the species which comprises a closed transmission-oil circuit. It is advantageous in that the transmission-oil circuit does not need to be opened upon release and removal of the milling unit from the machine frame of an earth working machine, so that the integrity of the transmission oil, and the quantity of the transmission oil present in the milling unit, are not influenced by removal of the milling unit from the machine frame.

In order to cool the transmission oil of the closed transmission-oil circuit, there is arranged therein a heat exchanger through which flows a cooling fluid that cools either the internal combustion engine or hydraulic oil of the earth working machine. The known milling unit therefore furnishes only part of a coolant circuit that, when the milling unit is arranged on the machine frame of the earth working machine, must be supplemented with a further machine-side part of the coolant circuit to yield a complete coolant circuit. This not only necessitates additional installation work, but also creates the risk of coolant loss and/or coolant contamination during installation and/or while the milling unit is separated from the remainder of the earth working machine.

DE 10 2012 010 947 A1 discloses a milling drum of an earth working machine which comprises a fan rotor in a radially inner region of a milling drum tube that carries milling tools on its outer side. The fan rotor is driven by the input drive shaft of the milling drum; the fan rotor can be operated by an interposed transmission having a rotation speed different from the drive shaft and from the milling drum. The fan rotor can also be separated from the drive shaft by a clutch, so that the fan rotor can be shut down independently of a rotation of the drive shaft.

The fan rotor in the radially inner region of the milling drum tube can deliver air to a transmission housing wall of a milling drum transmission and thereby remove heat convectively from the transmission housing wall.

On the one hand, the configuration of the transmission housing wall is solid and thick because of the considerable mechanical demands on a milling drum, so that not much of a convective cooling effect can be achieved by simply blowing onto a wall surface.

On the other hand, the milling drum in particular is located, during milling operation, in an atmosphere that is not only extraordinarily highly contaminated by milled material that just been removed, but also has a highly abrasive effect because of the kinetic energy of the milled material that has just been removed. The known fan rotor is therefore exposed to considerable mechanical wear.

SUMMARY OF THE DISCLOSURE

The technical object on which the present invention is based is therefore to ensure, while maintaining the closed operating-medium circuit already known from the existing art, effective cooling of the operating medium circulating in the operating-medium circuit and, in that context, avoiding the disadvantages that are known in the existing art and recited above.

The present invention achieves this object by way of a milling unit of the kind recited initially in which the heat exchanger is embodied for flow impingement by a cooling gas, separate from the operating medium, in an open cooling-gas flow. Thanks to the use of cooling gas for convective heat exchange with the operating medium at the heat exchanger, there is no need for a cooling-liquid circuit having an interface between a milling unit and a machine frame of the earth working machine. The use of an open cooling-gas flow, i.e. a cooling-gas flow that begins and/or ends in the ambient atmosphere, on the one hand allows the structural outlay for guiding the cooling-gas flow to be minimized or in fact entirely avoided. On the other hand, heat withdrawal from the cooling gas, which would be required in a closed cooling-gas circuit, is superfluous.

The cooling gas for the open cooling-gas flow can be taken from a reservoir container, arranged on the milling unit or on the remainder of the earth working machine carrying the milling unit, in which cooling gas is furnished in compressed fashion at a positive pressure with respect to the atmosphere. The advantage here is that before reaching the heat exchanger, the cooling gas that is furnished in compressed fashion in the container can be depressurized to atmospheric pressure in a free cooling-gas stream, i.e. a stream flowing only through the air of the ambient atmosphere, and can thereby be considerably cooled. The cooling effect of the cooling gas flowing in this manner through or past the heat exchanger can thereby be increased compared with cooling gas at ambient temperature. In terms of flow guidance of the cooling gas, it is sufficient to guide the cooling gas from the reservoir container onto the heat exchanger, for example through a cooling-gas conduit constituted, for instance, by a cooling-gas hose and/or a cooling-gas tube.

It is disadvantageous, however, that cooling gas is available in the reservoir container only in a limited quantity, and additionally that the cooling-gas flow possibly depends, in terms of quantity, on the particular residual gas pressure existing in the reservoir container. Advantageously, a cooling fan is therefore provided which is embodied and arranged to drive the cooling gas for flow impingement onto the heat exchanger.

The cooling fan can be arranged on a machine frame of the earth working machine that carries the milling unit having the heat exchanger, and can remain thereon even upon removal of the milling unit from the machine frame. Flow-directing surfaces, which direct the cooling gas driven by the cooling fan toward the heat exchanger, can then be arranged on the machine frame and/or on the milling unit.

According to a preferred refinement of the present invention, a distance between the cooling fan and the heat exchanger which is as short as possible, and thus a flow path between the cooling fan and the heat exchanger which is as short as possible and can thus make flow-directing surfaces entirely unnecessary, can be obtained by the fact that the cooling fan is arranged on the milling unit and remains thereon upon removal of the milling unit from the machine frame.

The cooling fan allows a sufficient convective gas flow to be furnished at any time, regardless of any other operating state of the milling unit or of the earth working machine. While the surroundings of the earth working machine are also highly contaminated during milling operation, in locally differing fashion, by swirling dust and the like, the degree of contamination on the milling drum housing is nevertheless, as a rule, substantially less than directly on the milling drum, as is known from DE 10 2012 010 947 A1.

The milling drum housing delimits, at least on both end faces axially with reference to the milling drum axis, on the upper side facing toward the machine frame during operation, and in and oppositely to a working direction orthogonal to the milling drum axis during operation, a receiving space in which the milling drum is rotatably received. The milling drum housing is open only toward the ground that is to be worked, so that milling engagement of the milling drum with the ground that is to be worked is possible.

One or both functional components from among the heat exchanger and cooling fan can be arranged directly on the milling drum housing or indirectly on the milling drum housing with interposition of further components.

The term "cooling fan" refers to an apparatus that comprises a fan blade rotatable around a fan axis, a fan frame rotatably supporting the fan blade, and a fan motor driving the fan blade to rotate around the fan axis. The fan blade preferably comprises several vanes that are preferably arranged angularly equidistantly around the fan axis.

The term "operating-medium pump" refers to any kind of conveying device that drives the operating medium to circulate in the operating-medium circuit.

The open cooling-gas flow generated by the cooling fan can be guided, in the region of the cooling fan and/or in the region of the heat exchanger, by an enclosure or by one or several conduits. Outside the cooling fan and heat exchanger, the cooling gas preferably flows freely.

The cooling gas is preferably air, so that it can be taken as an essentially inexhaustible cooling-gas supply from the atmosphere surrounding the milling unit, conveyed in heat-transferring contact past the heat exchanger and then, after passing by the heat exchanger, be blown into the atmosphere surrounding the milling unit with a heat content that deviates from the heat content upstream from the heat exchanger. Because the earth working machine moves forward in a working direction during milling operation, the earth working machine moves through the atmosphere that surrounds it. There is therefore no risk of creating, around the heat exchanger, a plume that contains ambient air becoming increasingly hotter because of the heat transfer at the heat exchanger, and that gradually decreases the cooling effect of the heat exchanger.

In order to prevent the heat exchanger and/or cooling fan, arranged on the milling drum housing additionally as compared with the existing art, from permanently and disadvantageously enlarging the outside dimensions of the milling drum housing, according to an advantageous refinement of the present invention provision is made that the heat exchanger and/or a fan frame of the cooling fan which rotatably supports a fan blade is/are arranged on the milling drum housing movably relative to the milling drum housing. All that must be considered here is that the operating-medium lines that deliver and discharge operating medium to and from the heat exchanger are embodied to be sufficiently long and flexible that those operating-medium lines can accommodate a movement of the heat exchanger relative to the milling drum housing without first needing to be detached from the heat exchanger.

Since the purpose of the cooling fan is always to convey cooling gas past or through the heat exchanger, the heat exchanger and the cooling fan can be embodied as a collectively preassembled subassembly in order to simplify production and installation. For example, the cooling fan can be connected (preferably detachably, for repair purposes) to one side of the heat exchanger. Alternatively, although in a degraded embodiment, the heat exchanger can be provided removably on the milling drum housing, if applicable as a preassembled subassembly together with the cooling fan. The heat exchanger is then connected via so-called quick-release couplings to the lines that deliver and discharge the operating medium, so that the heat exchanger can be detached with little effort from the remainder of the operating-medium circuit.

The heat exchanger is preferably a cross-flow heat exchanger. It can thereby provide a large heat-exchange surface between the operating medium and the cooling gas without itself needing to have excessively large dimensions for that purpose. In cross-flow heat exchangers, the flow directions of the operating medium and cooling gas at the heat exchanger enclose an angle, preferably a right angle, with one another. Preferably, on the heat-exchange surface of the heat exchanger which is wetted on one side by the operating medium and on the opposite side by the cooling gas, the dimension of the heat exchanger is smaller in the flow direction of the cooling gas than in the flow direction of the operating medium. It is thereby possible to obtain a flat heat exchanger that can easily be installed on or in a wall of the milling drum housing.

Additionally or alternatively, the heat exchanger can be a counterflow heat exchanger. In a counterflow heat exchanger, the flow paths of the operating medium and cooling gas are parallel but oppositely directed. Counterflow heat exchangers generally have a greater length than crossflow heat exchangers in the flow direction of the operating medium, but can be made thinner.

Also additionally or alternatively, the heat exchanger can be a parallel-flow heat exchanger. With a parallel-flow heat exchanger the flow paths of the operating medium and cooling gas are again parallel, but run in the same direction. The parallel-flow heat exchanger can also be configured with a slender design, i.e. with a comparatively small dimension radially to the flow direction of the operating medium in the heat exchanger, but with a comparatively large dimension in the flow direction.

The heat exchanger can have one of the aforementioned configurations in one portion, and at least one other in another portion.

For maximally effective heat transfer between the operating medium and cooling gas on the heat exchange surface, the heat exchanger preferably comprises conduits that are flowthrough-capable for the cooling gas. The cooling gas is thus guided by the heat exchanger while it flows past or through it.

In order to avoid an unnecessarily high contamination load on the heat exchanger and/or the cooling fan, the heat exchanger and/or the cooling fan is/are preferably arranged on that side of the milling drum housing which faces away from the milling drum. Filter devices can additionally be provided.

In order to ensure easy access to the heat exchanger and/or cooling fan, provision can be made that the heat exchanger and/or the cooling fan is/are arranged axially farther from the milling drum, with respect to the milling drum axis, than a side wall of the milling drum housing which axially delimits the milling drum housing on the heat-exchanger side. The side wall is then located axially between the milling drum on the one hand and the heat exchanger and/or cooling fan on the other hand. In this case the heat exchanger and/or the cooling fan can then itself/themselves be readily accessible when the milling unit is connected in milling-ready fashion to a machine frame of an earth working machine.

When the milling unit is connected in operationally ready fashion to a machine frame of an earth working machine, the milling drum is arranged with its one axial—axial with respect to the milling drum axis—longitudinal end closer to the so-called idle side of the earth working machine, or of the machine frame of the earth working machine, than with the respectively opposite other axial longitudinal end that is located axially closer to the so-called machine side of the machine frame or of the earth working machine The reason for this involves the apparatuses for torque transfer from the machine frame to the milling drum, for example a transmission belt (explained below) that is provided only on the machine side and interferes there with the machine operator's ability to see the ground portion being worked. On the idle side of the earth working machine that carries the milling unit, the earth working machine can be brought as accurately as possible to a predefined working edge of the ground because of the better visibility of the working region as compared with the machine side. Because the milling unit is always coupled in the same orientation to the machine frame of an earth working machine, and because as a rule the milling unit always also comprises, on the machine side, components of the milling drum drive system which are permanently installed (for example, an input drive pulley of the transmission belt), that end face of the milling unit which is always located on the machine side of the earth working machine can be referred to as a "machine side" of the milling unit, and the opposite side as an "idle side" of the milling unit.

The heat exchanger and/or the cooling fan is/are preferably arranged closer to the machine side than to the idle side, since a greater demand for operating media that heat up during operation exists on the machine side of the milling unit, so that when the heat exchanger and/or cooling fan is/are arranged closer to the machine side, it is possible to use shorter operating-medium lines to and away from to the heat exchanger than if it/they were arranged closer to the idle side. This also simplifies the routing of operating-medium lines on the milling unit.

In addition to the partial encasing of the milling drum by the milling drum housing, at least a part of an apparatus housing, in which an apparatus different from the milling drum is received when the milling unit is in the milling-ready state, can be arranged on the milling drum housing. The heat exchanger and/or cooling fan is/are then preferably arranged on or in a wall of the apparatus housing in order not only to utilize installation space, present in any case thanks to the apparatus housing, to accommodate the heat exchanger and/or cooling fan, but also to protect the heat exchanger and/or the cooling fan more effectively from external influences, in particular dirt.

A dust filter, through which the cooling fan draws in the cooling gas, in particular ambient air, is preferably arranged on the intake side of the cooling fan.

The aforementioned apparatus housing on the milling drum housing can be, for example, a transmission housing in which, when the milling unit is in the milling-ready state, a transmission apparatus that transfers a drive torque to the milling drum is arranged. An internal combustion engine is usually used on earth working machines as a central power source of the earth working machine. Power for advancing the earth working machine, as well as torque for rotational driving of the milling drum, are derived from the internal combustion engine, optionally with interposition of one or several hydraulic pumps. The transmission apparatus therefore preferably transfers drive torque from the remainder of the earth working machine to the milling drum. The apparatus housing is therefore preferably embodied only in part on the milling unit or on the milling drum housing. A further part of the apparatus housing is arranged on the machine frame of the earth working machine that receives the milling unit, so that once the milling unit has been arranged on the machine frame of the earth working machine, the unit-side housing part and the working-machine-side housing part combine to yield a complete apparatus housing.

In principle, the transmission apparatus can be any apparatus for transferring torque to the milling drum. The transmission apparatus preferably comprises a transmission belt. After removal of the milling unit from the remainder of the earth working machine, the transmission belt can remain either on the milling unit or on the earth working machine. A transmission belt allows transfer of a large amount of torque over a comparatively long distance, along with a large positional tolerance for the input drive shaft and output drive shaft. A transmission belt is furthermore very insensitive to dirt, compared with other transmissions.

To ensure that the heat exchanger and/or the cooling fan on the apparatus housing does/do not interfere with operation of the transmission belt, provision can be made that the heat exchanger and/or the cooling fan is/are arranged on a wall of the apparatus housing which is located opposite a recirculating belt surface located between the outer edges of the transmission belt. Because the belt surface just described has a comparatively large surface area, and furthermore recirculates and thus moves relative to the housing-mounted heat exchanger and/or cooling fan, there is no risk of undesired heating of the transmission belt even if the cooling gas, at a higher temperature after passing through the heat exchanger, strikes the belt surface.

According to an advantageous refinement of the invention, a separating apparatus, for example a guard panel or the like, which physically separates the transmission belt from the heat exchanger and/or the cooling fan, can be provided between the transmission belt and in particular the aforesaid belt surface on the one hand, and the heat exchanger and/or the cooling fan on the other hand. The heat exchanger and/or the cooling fan is/are thereby protected from mechanical influences of the transmission belt, and the transmission belt is protected from heated cooling-gas flows.

In principle, the operating medium can be any fluid, including a gas. The operating medium is preferably a liquid. The operating medium most frequently used in the milling unit is an oil. The oil can be a hydraulic oil for the operation of hydraulic devices such as piston-cylinder arrangements and/or hydraulic drive systems. The oil can be a lubricating oil. The oil can be, in particular, a transmission oil, which heats up during milling operation, of a milling drum transmission arranged in the milling unit in the transfer path of drive torque to the milling drum.

The milling unit is preferably a replaceable milling unit that is sufficiently securely connectable, in intentionally releasable fashion, to the machine frame of an earth working machine.

As a replaceable milling unit, the milling unit can comprise a mechanical coupling subassembly for repeatedly releasable mechanical coupling to a counterpart mechanical coupling subassembly on a machine frame of an earth working machine. The mechanical coupling subassembly of the replaceable milling unit can encompass a passthrough opening, in particular a passthrough bore, and/or a connecting bolt, in particular a threaded stud or threaded bolt. The counterpart coupling subassembly on the machine frame can likewise encompass a passthrough opening, in particular a passthrough bore, and/or a connecting bolt, in particular a threaded stud or threaded bolt.

The present invention furthermore relates to an earth working machine, for example a road milling machine, recycler, or surface miner, having a milling unit as described and refined above. For the reasons recited above, the earth working machine encompasses a machine frame having a counterpart mechanical coupling subassembly that enables rapid replacement or exchange of replaceable milling units.

BRIEF DESCRIPTION OF THE DRAWINGS

The present invention will be explained in further detail below with reference to the appended drawings, in which.

DETAILED DESCRIPTION

Figure 1:
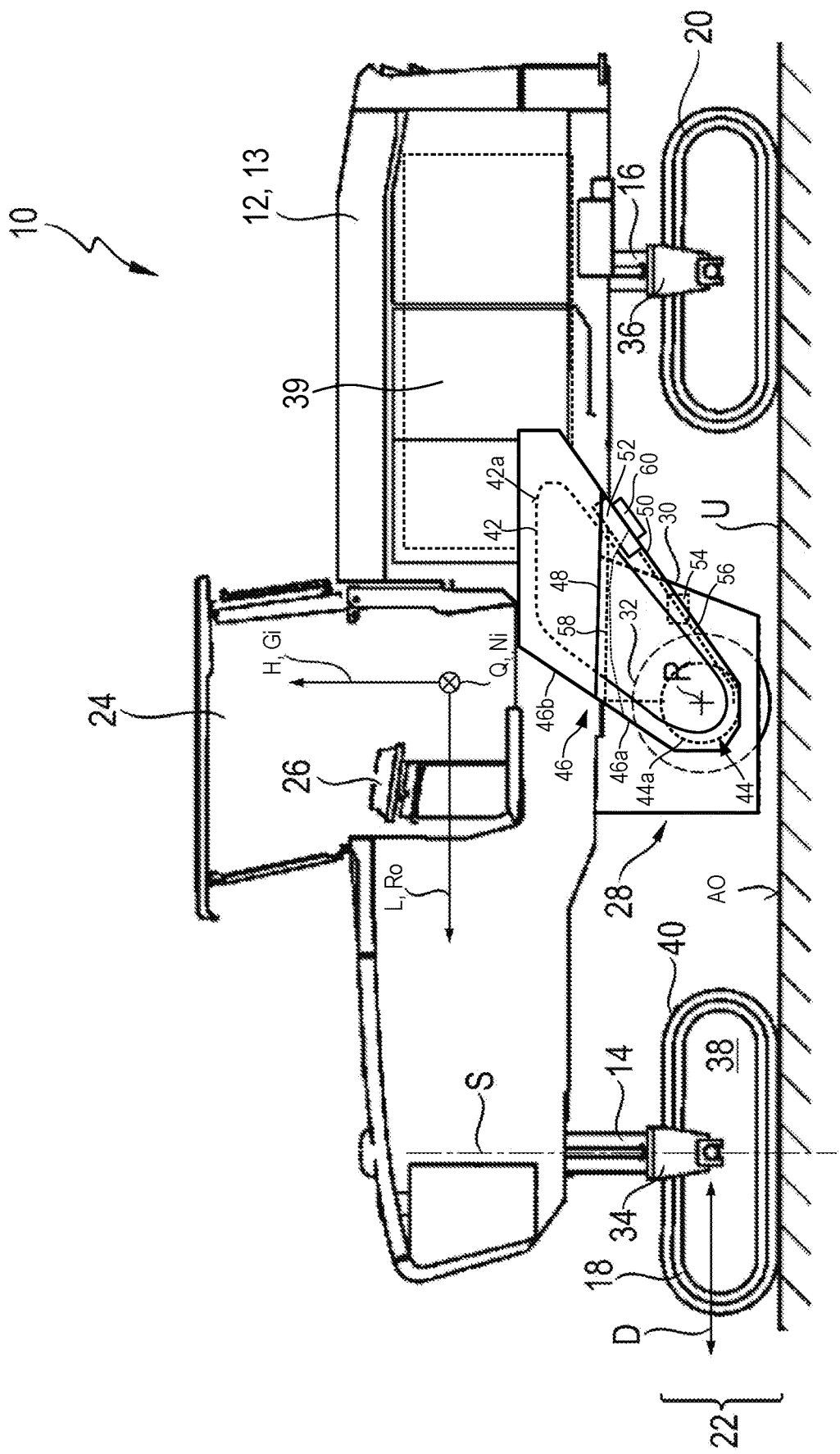
FIG. 1 is a schematic side view of an embodiment according to the present invention of an earth working machine in the form of a large milling machine, in a position for rolling travel operation.

In FIG. 1, an embodiment according to the present invention of an earth working machine in the form of a ground milling machine or road milling machine is labeled in general with the number 10. It encompasses a machine frame 12 that constitutes the basic framework for a machine body 13. Machine body 13 encompasses machine frame 12 and the components of machine 10 which are connected to the machine frame and optionally are movable relative thereto.

Machine body 13 encompasses front lifting columns 14 and rear lifting columns 16, which are connected at one end to machine frame 12 and at the other end respectively to front drive units 18 and to rear drive units 20. The distance between machine frame 12 and drive units 18 and 20 is modifiable by way of lifting columns 14 and 16.

Drive units 18 and 20 are depicted, by way of example, as crawler track units. Divergently therefrom, individual, or all, drive units 18 and/or 20 can also be wheel drive units.

The viewer of FIG. 1 is looking at earth working machine (or simply "machine") 10 in transverse machine direction Q which is orthogonal to the drawing plane of FIG. 1. The view of FIG. 1 is a view of the so-called "machine side" of earth working machine 10. A longitudinal machine direction orthogonal to transverse machine direction Q is labeled L, and proceeds parallel to the drawing plane of FIG. 1. A vertical machine direction H likewise proceeds parallel to the drawing plane of FIG. 1 and orthogonally both to longitudinal machine direction L and to transverse machine direction Q. The arrowhead of longitudinal machine direction L in FIG. 1 points in a forward direction. The forward direction is also the working or advance direction in which earth working machine 10 moves during milling operation. Vertical machine direction H proceeds parallel to the yaw axis of machine 10, longitudinal machine direction L proceeds parallel to the roll axis, and transverse machine direction Q proceeds parallel to pitch axis Ni.

Earth working machine 10 can have an operator's platform 24 from which a machine operator can control machine 10 via a control panel 26.

Arranged under machine frame 12 is a replaceable milling unit 28 having a milling drum 32 that is received in a milling drum housing 30 and is supported in milling drum housing 30 rotatably around a milling drum axis R that proceeds in transverse machine direction Q, so that during earth working, substrate material can thereby be removed from supporting surface AO of substrate U to a milling depth determined by the relative height position of machine frame 12.

The vertical adjustability of machine frame 12 by way of lifting columns 14 and 16 also serves to adjust the milling depth of machine 10 in the context of earth working. Earth working machine 10 that is depicted by way of example is a large milling machine, for which the arrangement of milling unit 28 between front and rear drive units 18 and 20 in longitudinal machine direction L is typical. Large milling machines of this kind, or substrate-removing machines in general, usually comprise a transport belt for transporting removed substrate material away from machine 10. In the interest of better clarity, a transport belt that is also present in principle on machine 10 is not depicted in FIG. 1.

It is not apparent from the side view of FIG. 1 that machine 10 comprises, both in its front end region and in its rear end region, two respective lifting columns 14 and 16 each having a drive unit 18, 20 connected thereto. Front lifting columns 14 are coupled to drive units 18, in a manner furthermore known per se, by means of a respective drive unit connecting structure 34, for example a connecting fork that spans drive unit 18 in transverse machine direction Q. Rear lifting columns 16 are connected to their respective drive unit 20 via a drive unit connecting structure 36 configured identically to drive unit connecting structure 34. Drive units 18 and 20 are of substantially identical construction and constitute propelling unit 22 of the machine. Drive units 18 and 20 are motor-driven, as a rule by a hydraulic motor (not depicted).

The drive power source of machine 10 is constituted by an internal combustion engine 39 received on machine frame 12. In the exemplifying embodiment depicted, milling drum 32 is driven by said engine to rotate. The output of internal combustion engine 39 furthermore makes available on machine 10 a hydraulic pressure reservoir with which hydraulic motors and hydraulic actuators on the machine are operable. Internal combustion engine 39 is thus also a source of the propulsive energy of machine 10.

In the example depicted, drive unit 18, having a running direction indicated by double arrow D, comprises a radially inner receiving and guidance structure 38 on which a recirculatable drive chain 40 is arranged and is guided for recirculating motion.

Lifting column 14, and with it drive unit 18, is rotatable by a steering apparatus (not depicted in further detail) around a steering axis S. Preferably additionally, but also alternatively, lifting column 16, and with it drive unit 20, can be rotatable by a steering apparatus around a steering axis parallel to steering axis S.

The "machine side" of earth working machine 10 is the side on which the drive system of milling drum 23 is located. A transmission belt 42, indicated merely with a dashed line in FIG. 1, transfers torque from internal combustion engine 39 to milling drum 32. The torque is transferred directly to a milling drum transmission 44 that is received in milling drum housing 30 in a manner known per se, usually as a planetary transmission. Milling drum transmission 44 steps the drive rotation speed of internal combustion engine 39 down to a slower drum rotation speed of milling drum 32 and, to the same degree, steps up the torque transferred to milling drum 32.

Transmission belt 42 is located outside the milling drum housing axially with respect to milling drum axis R, and is protected by a belt housing 46 that surrounds transmission belt 42 on all sides in order to protect transmission belt 42 from undesired external influences, for instance the dirt that unavoidably occurs at the location where milling drum 32 engages with substrate U.

Belt housing 46 is subdivided into a lower housing part 46a that is a permanent constituent of milling unit 28 and is connected permanently to milling drum housing 30, and an upper housing part 46b that is connected permanently to machine frame 12. When milling unit 28 is removed from machine frame 12, upper housing part 46b therefore remains on machine frame 12, while lower housing part 46a is removed, along with milling unit 28, from the remainder of earth working machine 10. A separation joint 48 indicates the boundary between lower housing part 46a and upper housing part 46b. Belt housing 46 is depicted in FIG. 1 cut away in the lower part. A dashed line proceeding below separation joint 48 shows the boundary between the sectioned and unsectioned parts of belt housing 46.

A heat exchanger 52, through which transmission oil of milling drum transmission 44 flows, is arranged on a wall 50, oriented orthogonally to the drawing plane of FIG. 1, of lower housing part 46a oppositely from a belt surface 42a that is likewise orthogonal to the drawing plane of FIG. 1. Belt surface 42a is located between the two belt edges 42b and 42c (see FIGS. 2 and 3) in a belt width direction. Belt surface 42a faces away from pulleys 62, 64, and 66 that guide it as it recirculates.

The transmission oil is conveyed, by an oil pump 54 that is depicted merely symbolically, via a first conveying line 56 from milling drum transmission 44 to heat exchanger 52 and from there, after passing through heat exchanger 52, via a second conveying line 58 back to milling drum transmission 44. Milling drum transmission 44, in particular milling drum transmission housing 44a; first conveying line 56; oil pump 54; heat exchanger 52; and second conveying line 58 form a closed transmission oil circuit in which the transmission oil circulates when oil pump 54 is in operation. Oil pump 54 can also be arranged in transmission housing 44a.

A cooling fan 60 is arranged on heat exchanger 52 so that the transmission oil in heat exchanger 52 can be cooled. Cooling fan 60 is operable, for example, electrically or hydraulically, and generates an air flow through heat exchanger 52.

Figure 2:
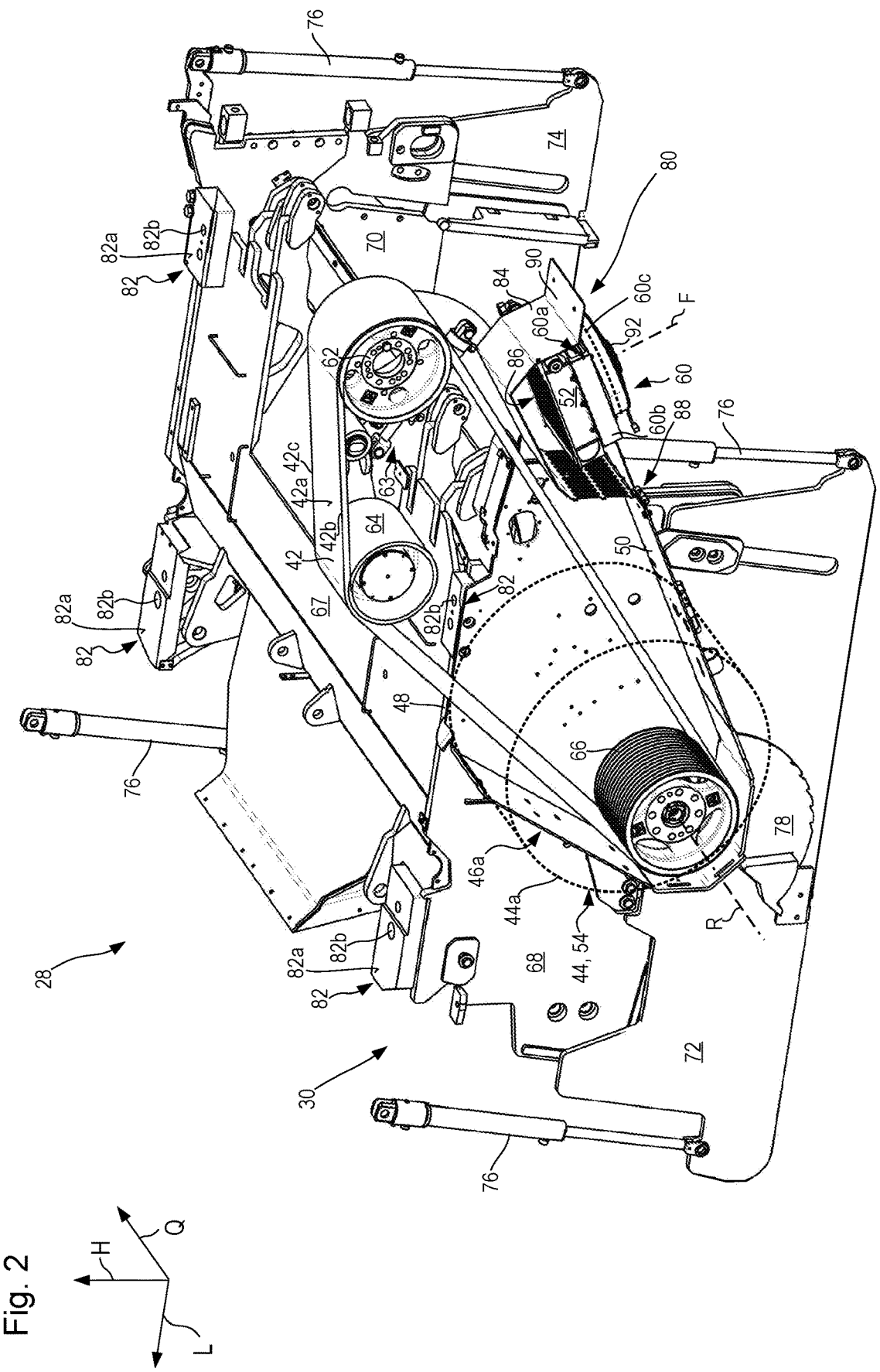
FIG. 2 is a schematic perspective view of an embodiment according to the present invention of a milling unit of FIG. 1 having a transmission belt and belt pulleys.
Figure 3:
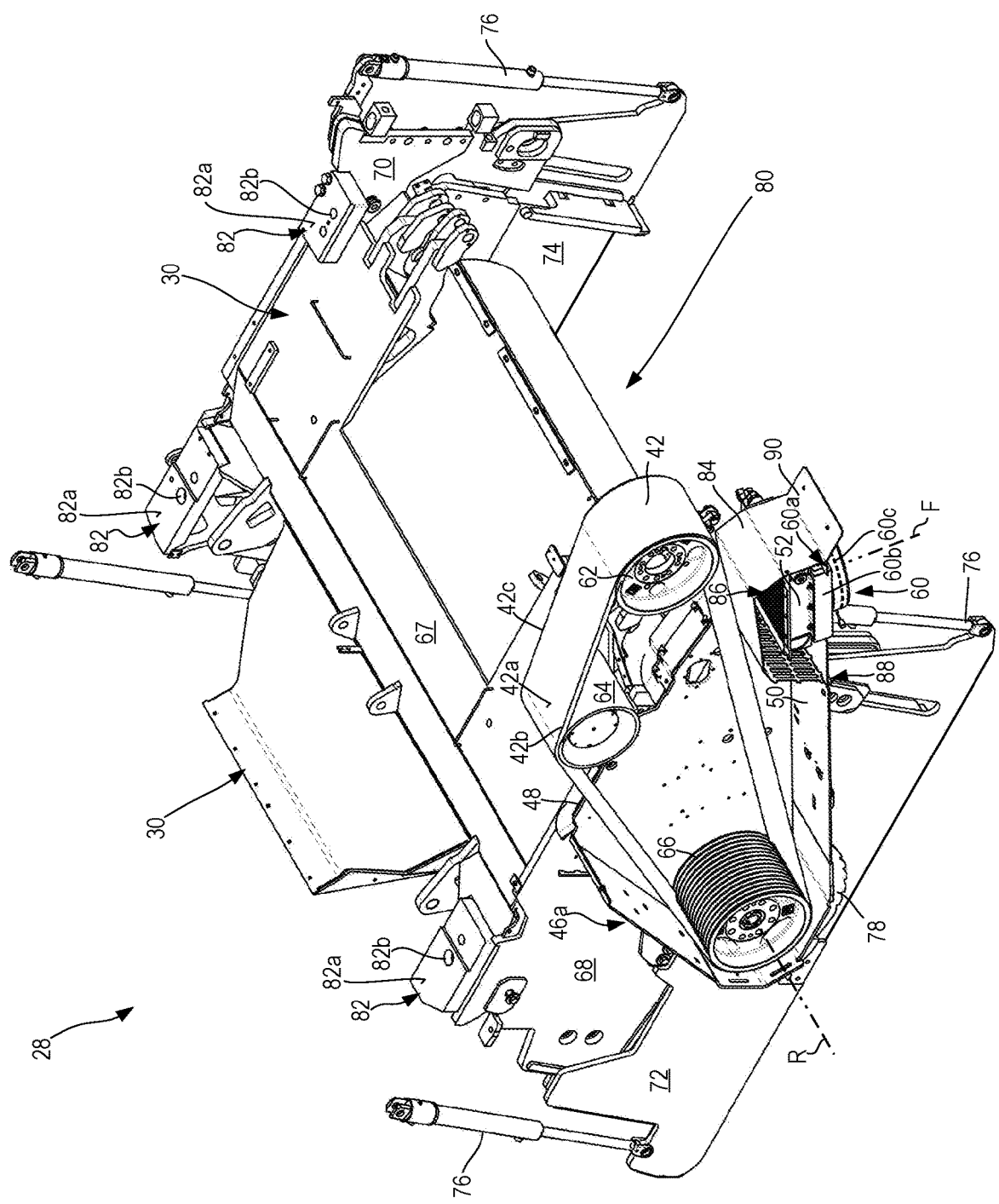
FIG. 3 is a further schematic perspective view of the embodiment according to the present invention of a milling unit of FIGS. 1 and 2 having a transmission belt and belt pulleys.
Figure 3:
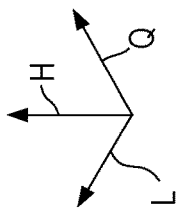
Figure 4:
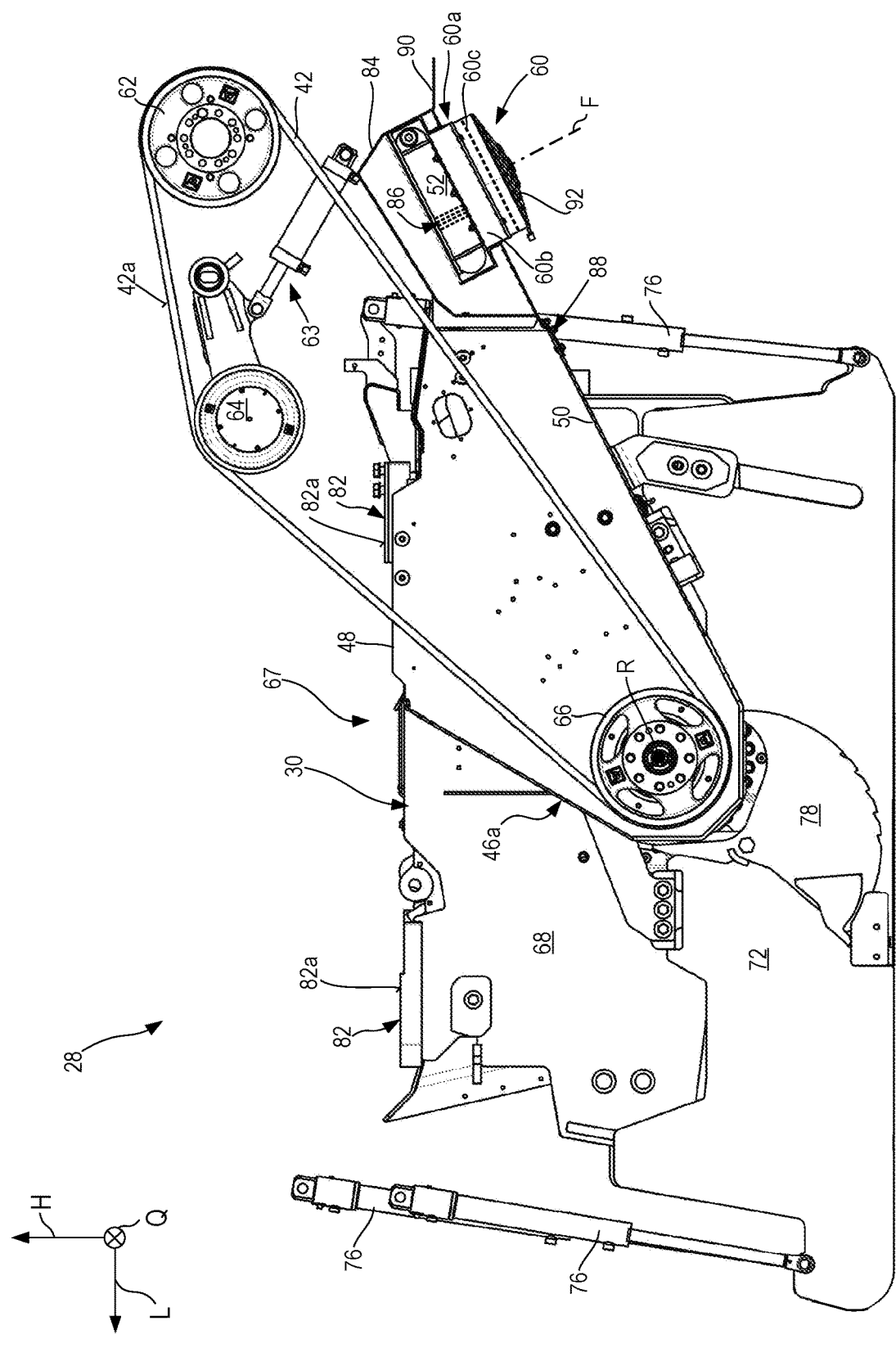
FIG. 4 is a schematic axial view, along the milling drum axis, of the embodiment according to the present invention of a milling unit of FIGS. 1 to 3 having a transmission belt and belt pulleys.

Milling unit 28 is depicted in FIGS. 2 to 4 without the remainder of earth working machine 10. FIGS. 2 and 3 are perspective views obliquely from above; FIG. 4 is a side view along milling drum axis R. The scraper apparatus that usually forms the back side of milling drum housing 30, and is displaceable in vertical direction H, is not depicted in the Figures.

As depicted in FIGS. 2 to 4, transmission belt 42 recirculates around an internal-combustion-engine-side input drive pulley 62, around a tensioning pulley 64 displaceable by a tensioning mechanism 63, and around a milling-drum-side output drive pulley 66. Input drive pulley 62, tensioning mechanism 63, and tensioning pulley 64 are connected to machine frame 12 of earth working machine 10 and are not part of milling unit 28.

Oil pump 54, shown merely schematically and symbolically in FIG. 1 for the sake of completeness, is located, in the embodiment of a replaceable milling unit 28 of FIGS. 2 to 4, in housing 44a of milling drum transmission 44, and is driven by the input shaft, coupled nonrotatably to output drive pulley 66, of milling drum transmission 44.

Milling drum housing 30 encompasses, as housing components, a cover 67 that covers milling drum housing 30 at the top toward machine frame 12 of earth working machine 10, and respective upper side panel parts 68, 70 on its end faces that are axial with respect to milling drum axis R. Arranged on upper side panel parts 68, 70, movably relative thereto in vertical direction H, are respective lower side panel parts 72 and 74 that are vertically adjustable via hydraulic or pneumatic piston-cylinder arrangements 76. Piston-cylinder arrangements 76 can also be switched to zero force in order to allow lower side panel parts 72 and 74 to rest on substrate U floatingly, i.e. only under their own weight.

A wall of milling drum housing which physically separates milling drum 32 from the environment is constituted in a frontward longitudinal direction by a holddown (concealed in FIGS. 2 to 4) that is displaceable in vertical direction H, and in a rearward longitudinal direction by the aforementioned scraper apparatus.

A cover disk 78 arranged on lower side panel 72 movably relative thereto covers an elongated hole that is embodied in lower side panel 72 and is penetrated by the input shaft, carrying output drive pulley 66, of milling drum transmission 44, variably depending on the milling depth established by vertical displacement of machine frame 12, in order to prevent dirt from emerging from receiving and working space 80 of milling drum 32 during a milling operation.

Arranged on the upper side of milling drum housing 30, which faces toward machine frame 12 during milling operation, are four coupling subassemblies 82 that are embodied for mechanical coupling to a corresponding counterpart coupling subassembly on machine frame 12. Each coupling subassembly 82 encompasses a defined abutment surface 82a having at least one passthrough bore 82b. Passthrough bores 82b of coupling subassembly 82 are brought into alignment with corresponding through bores on the counterpart coupling subassembly, configured substantially identically, of machine frame 12, whereupon a threaded bolt (not depicted) is passed through the aligned passthrough bores. The threaded bolts are secured against loosening by being screwed into a thread, either the thread of a nut or the thread of a component that is stationary on one constituent from among machine frame 12 and milling drum housing 30. Milling drum housing 30 or milling unit 28 is then sufficiently fixedly mechanically coupled to machine frame 12. Once transmission belt 42 is put in place and tightened, milling drum 32 is operationally ready.

Because milling unit 28 has a closed transmission-oil circuit, milling unit 28 does not need to be coupled to a transmission-oil or lubricating-oil supply of the remainder of earth working machine 10 after mechanical coupling to machine frame 12. It can be necessary, however, to couple milling unit 28 releasably to a hydraulic-oil source and/or to an electricity source of the remainder of earth working machine 10.

Arranged between heat exchanger 52 and transmission belt 42, more precisely that run of transmission belt 42 which is located between input drive pulley 62 and output drive pulley 66 on the side opposite from tensioning pulley 64, is a guard panel 84 that protects heat exchanger 52 from undesired mechanical effects of components from belt housing 46, for example if a movable part such as a nut or screw, or a stone, happens to get into belt housing 46, or if a part of transmission belt 42 becomes detached. A movable part of this kind can acquire considerable energy in belt housing 46, which can be sufficient to damage heat exchanger 52. Not only could the loss of transmission oil which then occurs result in damage to milling drum transmission 44, but the emerging transmission oil could produce substantial contamination of substrate U. Guard panel 84 can furthermore direct the air flow of cooling fan 60, regardless of whether heat exchanger 52 is located on the intake side or discharge side of cooling fan 60.

Air moved by cooling fan 60 passes through conduits 86 and through heat exchanger 52 substantially orthogonally to wall 50 that carries heat exchanger 52 and cooling fan 60.

As is evident especially from FIG. 4, that portion of lower housing part 46a which carries heat exchanger 52 and cooling fan 60 can be swung down around a hinge 88, clockwise in FIG. 4, out of the operationally ready position shown in FIGS. 2 to 4 in order to allow the dimension of milling unit 28 parallel to longitudinal direction L to be shortened for transporting said unit. A handle 90 on guard panel 84, which is formed by bending down one longitudinal end of guard panel 84, facilitates manual displacement of heat exchanger 52 and of cooling fan 60 between their operationally ready position as depicted and the swung-down transport position.

Cooling fan 60 encompasses a fan frame 60a and a fan motor 60b. A fan blade 60c, indicated merely schematically in FIGS. 2 to 4, rotates in fan frame 60a around a fan axis F driven by fan motor 60b, and thereby moves air along fan axis F. The air driven by cooling fan 60 is "removed" from the ambient atmosphere and, after passing through cooling fan 60 and heat exchanger, is returned to the ambient atmosphere at a different location. There is no closed air circuit. Beyond cooling fan 60 and heat exchanger 52, the air that is being driven flows freely.

On its side facing away from the heat exchanger, fan frame 60a can be protected by a grid guard 92 from the entry of stones and the like. In addition to grid guard 92, an air filter that also filters finer particles can be provided in order to prevent the small cooling-air conduits 86 proceeding along fan axis F from becoming clogged with (in some cases, moist) dust particles carried along by the cooling air. This is applicable in particular when heat exchanger 52 is located on the discharge side of cooling fan 60.

As previously noted the cooling fan 60 may be arranged either on the milling unit 28 or on the machine frame 12. FIG. 1 schematically represents both alternatives. The alternative of the cooling fan 60 arranged on the milling unit 28 has been shown in detail in FIGS. 2-4 and described above. For the alternative having the cooling fan 28 arranged on the machine frame 12 of the earth working machine 10 that carries the milling unit 28 having the heat exchanger 52, the cooling fan 60 can remain on the machine frame 12 even upon removal of the milling unit 28 from the machine frame 12. For this alternative the locations of the hinge 88 and handle 90 are reversed as compared to the embodiment shown in FIGS. 2-4. Flow-directing surfaces, which direct the cooling gas driven by the cooling fan 60 toward the heat exchanger 52, can then be arranged on the machine frame 12 and/or on the milling unit 28.

The invention claimed is:

1. A milling unit for an earth working machine, comprising:
   a milling drum;
   a milling drum housing supporting the milling drum rotatably around a milling drum axis, the milling drum housing surrounding the milling drum on a plurality of sides;
   a closed operating-medium circuit including:
      an operating-medium pump configured to circulate an operating medium in the operating-medium circuit; and
      a heat exchanger through which the operating medium flows during circulating flow of the operating medium, the heat exchanger being arranged directly or indirectly on the milling drum housing, and the heat exchanger being configured for heat transfer from the operating medium to a cooling gas in an open cooling-gas flow;
   a cooling fan arranged directly or indirectly on the milling drum housing and configured to drive the cooling gas for flow impingement onto the heat exchanger; and
   wherein the heat exchanger and the cooling fan are arranged axially farther from the milling drum than is a side wall of the milling drum housing which axially delimits the milling drum housing.

2. The milling unit of claim 1, wherein:
the heat exchanger is arranged movably relative to the milling drum housing.

3. The milling unit of claim 1, wherein:
the cooling fan includes a fan frame rotatably supporting a fan blade, the fan frame being arranged movably relative to the milling drum housing.

4. The milling unit of claim 1, further comprising:
the heat exchanger, the heat exchanger and the cooling fan collectively being a preassembled subassembly.

5. The milling unit of claim 1, wherein:
the heat exchanger includes at least one heat exchanger selected from the group consisting of:
a cross-flow heat exchanger;
a counterflow heat exchanger;
a parallel-flow heat exchanger; and
the heat exchanger includes cooling-gas conduits which are flowthrough-capable for the cooling gas.

6. The milling unit of claim 1, further comprising:
a milling drum transmission arranged in a transfer path of drive torque to the milling drum; and
wherein the operating medium is a transmission oil of the milling drum transmission.

7. The milling unit of claim 1, further comprising:
a mechanical coupling subassembly configured for repeated releasable mechanical coupling to a counterpart coupling subassembly on a machine frame of the earth working machine.

8. The milling unit of claim 1 in combination with the earth working machine.

9. An earth working machine, comprising:
a machine frame;
a milling unit removably mounted on the machine frame, the milling unit including:
a milling drum;
a milling drum housing supporting the milling drum rotatably around a milling drum axis, the milling drum housing surrounding the milling drum on a plurality of sides; and
a closed operating-medium circuit including:
an operating-medium pump configured to circulate an operating medium in the operating-medium circuit; and
a heat exchanger through which the operating medium flows during circulating flow of the operating medium, the heat exchanger being configured for heat transfer from the operating medium to a cooling gas in an open cooling-gas flow; and
a cooling fan configured to drive the cooling gas for flow impingement onto the heat exchanger, the cooling fan being carried by the machine frame such that the cooling fan remains on the machine frame upon removal of the milling unit from the machine frame.

10. A milling unit for an earth working machine, comprising:
a milling drum;
a milling drum housing supporting the milling drum rotatably around a milling drum axis, the milling drum housing surrounding the milling drum on a plurality of sides;
a closed operating-medium circuit including:
an operating-medium pump configured to circulate an operating medium in the operating-medium circuit; and
a heat exchanger through which the operating medium flows during circulating flow of the operating medium, the heat exchanger being configured for heat transfer from the operating medium to a cooling gas in an open cooling-gas flow;
a cooling fan configured to drive the cooling gas for flow impingement onto the heat exchanger;
a transmission housing arranged on the milling drum housing, the transmission housing being configured to receive a transmission apparatus configured to transfer a drive torque to the milling drum when the milling unit is in a milling-ready state; and
wherein the heat exchanger and the cooling fan are arranged on a wall of the transmission housing.

11. The milling unit of claim 10 wherein:
the transmission apparatus includes a transmission belt.

12. The milling unit of claim 11 wherein:
the heat exchanger and the cooling fan are arranged on a wall of the transmission housing located opposite a recirculating belt surface located between outer edges of the transmission belt.

* * * * *

UNITED STATES PATENT AND TRADEMARK OFFICE
CERTIFICATE OF CORRECTION

| | |
|---|---|
| PATENT NO. | : 11,447,918 B2 |
| APPLICATION NO. | : 16/867862 |
| DATED | : September 20, 2022 |
| INVENTOR(S) | : Tobias Stinner, Christian Berning and Sebastian Bötzius |

It is certified that error appears in the above-identified patent and that said Letters Patent is hereby corrected as shown below:

In the Claims

Column 13, Line 11:
Delete "the heat exchanger," before --the heat exchanger--.

Signed and Sealed this
Twentieth Day of December, 2022

*Katherine Kelly Vidal*

Katherine Kelly Vidal
*Director of the United States Patent and Trademark Office*